United States Patent [19]

Kimura et al.

[11] Patent Number: 5,055,950
[45] Date of Patent: Oct. 8, 1991

[54] FLOPPY DISK DRIVER WITH PROTECTIVE ROTATION CONTROL APPARATUS

[75] Inventors: Keita Kimura, Kawasaki; Koichiro Kawamura, Yokohama, both of Japan

[73] Assignee: Nikon Corporation, Tokyo, Japan

[21] Appl. No.: 395,077

[22] Filed: Aug. 17, 1989

[30] Foreign Application Priority Data

Aug. 24, 1988 [JP] Japan .................. 63-210073

[51] Int. Cl.⁵ .............. G11B 19/12; G11B 19/20
[52] U.S. Cl. .................... 360/74.5; 360/74.1; 360/73.03
[58] Field of Search ........... 360/74.5, 74.1, 73.03, 360/97.04

[56] References Cited

U.S. PATENT DOCUMENTS

| | | | |
|---|---|---|---|
| 3,829,612 | 8/1974 | Beyers, Jr. ............... | 360/73.03 |
| 3,983,316 | 9/1976 | Schopp .................. | 360/73.03 |
| 4,123,779 | 10/1978 | Goldschmit .............. | 360/73.03 |
| 4,658,191 | 4/1987 | Okita et al. .............. | 318/314 |
| 4,679,181 | 7/1987 | Naito .................... | 369/50 |
| 4,717,969 | 1/1988 | Miyaki ................... | 360/73.03 |
| 4,727,530 | 2/1988 | Tomisawa ................ | 369/50 |
| 4,779,260 | 10/1988 | Kaheko et al. ............ | 360/74.1 |
| 4,816,937 | 3/1989 | Fukushima ............... | 360/73.03 |
| 4,823,203 | 4/1989 | Narusawa ................ | 360/73.03 |

FOREIGN PATENT DOCUMENTS

59-178364 10/1984 Japan .

Primary Examiner—John H. Wolff
Assistant Examiner—Craig A. Renner
Attorney, Agent, or Firm—Shapiro and Shapiro

[57] ABSTRACT

A floppy disk driver includes a loader for mounting a disk, a drive for rotating the disk at a predetermined rotational speed, a speed detector for detecting when the disk reaches the predetermined rotational speed, a fluctuation detector for detecting fluctuation in rotational speed of the disk, and a defect detector responsive to a speed detection signal produced by the speed detector or a fluctuation detection signal produced by the fluctuation detector for determining the presence of a defect condition based on production of the fluctuation detection signal during a predetermined period after production of the speed detection signal and for causing the drive to stop rotating the disk when a defect condition is determined to be present.

15 Claims, 9 Drawing Sheets

FLOPPY DISK DRIVER WITH PROTECTIVE ROTATION CONTROL APPARATUS

BACKGROUND OF THE INVENTION

1. Field of the Invention

The present invention relates to a floppy disk driver for loading a floppy disk for analog recording of signals, such as a floppy disk driver for analog recording of image signal, and is more particularly concerned with a floppy disk driver incorporating protective rotation control apparatus for avoiding disk and/or driver damage due, for example, to shape or mounting defects of the disk.

2. Related Background Art

In a floppy disk for analog recording, unevenness in rotation directly affects the reproduced signal. Consequently a higher precision in rotation is required in the analog recording than in the digital recording.

In the following description, a video floppy disk for handling image signals will be considered as an example of analog recording.

For controlling the rotation of a diskdriving motor, there have been known a phase control method and a speed control method. In the phase control method, the rotation is so controlled that the phase of a rotation phase signal, generated in every turn of the motor, coincides with that of a reference clock signal. In the speed control method, the rotation is controlled by detecting the rotating speed of the motor. The phase control method is superior in precision to the speed control method, but requires a longer time from the start to the lock-in state, as the increase of revolution at the start of motor is slower.

For avoiding the drawbacks of these methods, there has been proposed, for example in the U.S. Pat. No. 4,658,191, an apparatus provided with means for detecting that the difference between the phase of the reference clock signal and the rotating phase of the motor is within a predetermined range, and the above-mentioned drawbacks are avoided by switching the speed control method and the phase control method according to the phase difference.

If fluctuation exists, at the signal recording or reproduction, in the rotation of the video floppy disk (hereinafter simply called disk) for analog recording of image signal, the recorded or reproduced image becomes distorted and is deteriorated in quality. For preventing such phenomenon, there may be provided means for detecting the fluctuation in rotation, thereby interrupting the signal recording or reproduction. For detecting such fluctuation in rotation there has been proposed, for example in the Japanese Laid-open Patent Sho 59-178364, a device which generates plural pulses in every turn of the motor, inspects whether the intervals of said plural pulses are within a predetermined range, and identifies an abnormality in rotation if said interval is outside said range. The recording operation, for example in an electronic still camera, with a floppy disk driver equipped with a rotation control device and a device for detecting the fluctuation in rotation is conducted in the following manner. After the start of power supply, the disk reaches a constant revolution (called locked-in state) by said rotation control device. Then the image of an object is taken with a solid-state image sensor, and the output signal therefrom is processed by a signal processing circuit The output of said circuit is recorded on the disk, after the absence of fluctuation in rotation is confirmed by said fluctuation detecting device.

The conventional floppy disk drive is, at least in principle, kept free from fluctuation in rotation by a servo mechanism of said rotation control device, once the disk reaches the constant rotation state by said rotation control device Consequently the abovementioned fluctuation detecting device has been omitted in conventional floppy disk drives. However certain external perturbations not absorbable by said servo mechanism can exist particularly in drives used in the hand-held state, such as those in the electronic still camera. The above-mentioned fluctuation detecting device is therefore being utilized as a measure for such external perturbation.

Figure 1:
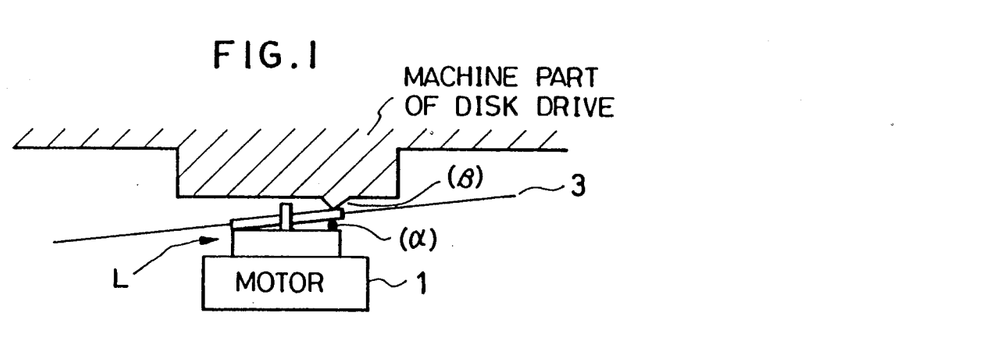
FIG. 1 is a schematic view showing the loaded state of a video floppy disk with a defective hub.

As an example of a video floppy disk, there is known the standardized 2-inch video floppy disk. When a great number of such 2-inch video floppy disks are mass produced, there may appear defective ones of which shape, particularly the shape of the hub, does not meet standardized specifications. Such defective video floppy disk may touch a part of the disk drive during a turn, thus causing a fluctuation in torque in a position of the disk. Also such torque fluctuation in a certain position may appear even with a non-defective video floppy disk, in case the disk is inclined by a chucking error or by the presence of dust particles. FIG. 1 illustrates the cause of such torque fluctuation in simplified and exaggerated manner. In FIG. 1, ($\alpha$) indicates the position of a shape defect or dust, and a disk 3 mounted on a loader L is thus inclined and contacts the most prominent part ($\beta$) of an opposed machine part of the disk drive (so designated), thus causing fluctuation in torque applied by a disk drive motor 1.

If there is significant contact between the video floppy disk and the disk driver, the fluctuation in torque becomes larger and the rotation cannot reach the locked-in state at the start of the motor. There is already employed, therefore, a method of interrupting the operation if the disk does not reach the locked-in state within a predetermined time after the start of the motor. However, if said contact between the video floppy disk and the disk driver is not significant, the disk can reach the locked-in state. In such case the fluctuation in rotation can still occur by the contact between the video floppy disk and the disk driver even after said locked-in state is reached, but such contact cannot be detected since said fluctuation in rotation is absorbed within a short time by the aforementioned rotation control device. In the conventional electronic still cameras, as explained before, the recording or reproducing operation is conducted when the absence of fluctuation in rotation is confirmed by the fluctuation detecting device after the rotation of the video floppy disk reaches the locked-in state, and such recording or reproducing operation cannot be interrupted once it is started, even if fluctuation in rotation occurs in the course. Since the aforementioned fluctuation in rotation, resulting from the contact between the video floppy disk and the disk driver, is periodical, such recording or reproducing operation is actually conducted with periodic fluctuation in rotation. Also, the repeated contact between the video floppy disk and the disk driver will eventually abrade the video floppy disk or the disk driver, thus causing damage therein. These phenomena are not limited to video floppy disks but appear in any analog video floppy disks and the corresponding disk drivers. For the purpose of simplicity, a driver for video floppy disk will be described in the following.

SUMMARY OF THE INVENTION

An object of the present invention is to prevent erroneous operation and damage in a floppy disk driver caused by fluctuation in rotation (fluctuation in rotating speed absorbable by a servo mechanism within a relatively short period), resulting from a defective hub or a chucking error of a floppy disk.

Another object of the present invention is to provide a disk driver provided with detection means for detecting the fluctuation in rotation in continuous manner at least for the first turn of the disk after the locked-in state is reached at the start of motor, and adapted to generate an error signal for terminating the rotation of the video floppy disk when an abnormality is detected by said detection means.

Still another object of the present invention is to provide a disk driver provided with detection means for detecting the fluctuation in a substantially same rotational position at least in the first two turns of the disk after the locked-in state is reached at the start of motor, and adapted to generate an error signal for terminating the rotation of the video floppy disk when an abnormality is detected by the detection means.

Still another object of the present invention is to provide a disk driver provided with detection means for detecting the presence of at least a rotational fluctuation in each turn, at least for the first several turns of the disk after the locked-in state is reached at the start of motor, and adapted to generate an error signal for terminating the rotation of the video floppy disk when an abnormality is detected by the detection means.

If contact occurs between the video floppy disk and the disk driver, fluctuation in rotation always occurs in the position of said contact at least once in each turn even after the locked-in state of rotation is reached. Thus the first above-mentioned disk driver can detect such contact between the video floppy disk and the disk driver, by inspecting the rotational fluctuation in continuous manner at least for the first turn of the disk after the locked-in state is reached.

The second above-mentioned disk driver is particularly effective for an apparatus to be used in hand-held or unstable state, such as an electronic still camera. If abnormal rotation is caused by an external perturbation accidentally applied during the first turn of the disk or the predetermined inspecting period after the locked-in state of rotation is reached, the first-mentioned disk drive mistake such abnormal rotation as caused by the contact between the video floppy disk and the disk driver. In order to prevent this drawback, the second-mentioned driver utilizes a fact that the rotational fluctuation resulting from the contact between the video floppy disk and the disk driver always occurs at substantially the same rotational position in every turn. Thus the second disk driver can detect the contact between the video floppy disk and the disk driver by detecting, in case of a rotational abnormality in the first turn after the locked-in state of rotation is reached, whether the rotational abnormality takes place at the same rotational position at least in an immediately succeeding turn.

The third above-mentioned disk driver is particularly effective for an apparatus to be used in hand-held or unstable state, such as an electronic still camera, in which the above-mentioned contact between said video floppy disk and the disk driver is caused by contamination for example with dust. As explained above, the first disk driver is unable to distinguish the external perturbation from said contact. Also the second disk driver may overlook the trouble caused by contamination by foreign matter such as dust, because the position of such foreign matter may move during a turn of the disk. In order to prevent this drawback, the third disk driver utilizes a fact that the contact between the video floppy disk and the disk driver always causes rotational fluctuation at the position of said contact in every turn, even if said contact is caused by a foreign material movable in position. Thus said third disk driver can detect the contact between the video floppy disk and the disk driver, by detecting the presence of any such rotational abnormality in each turn at least in the first two consecutive turns after the locked-in state of rotation is reached.

As the rotation of the video floppy disk is immediately terminated upon detection of the abnormality in any of the first to third disk drivers, there can be prevented the damage resulting from abrasion at the contact position between the video floppy disk and the disk driver.

DETAILED DESCRIPTION OF THE PREFERRED EMBODIMENTS

Figure 2:
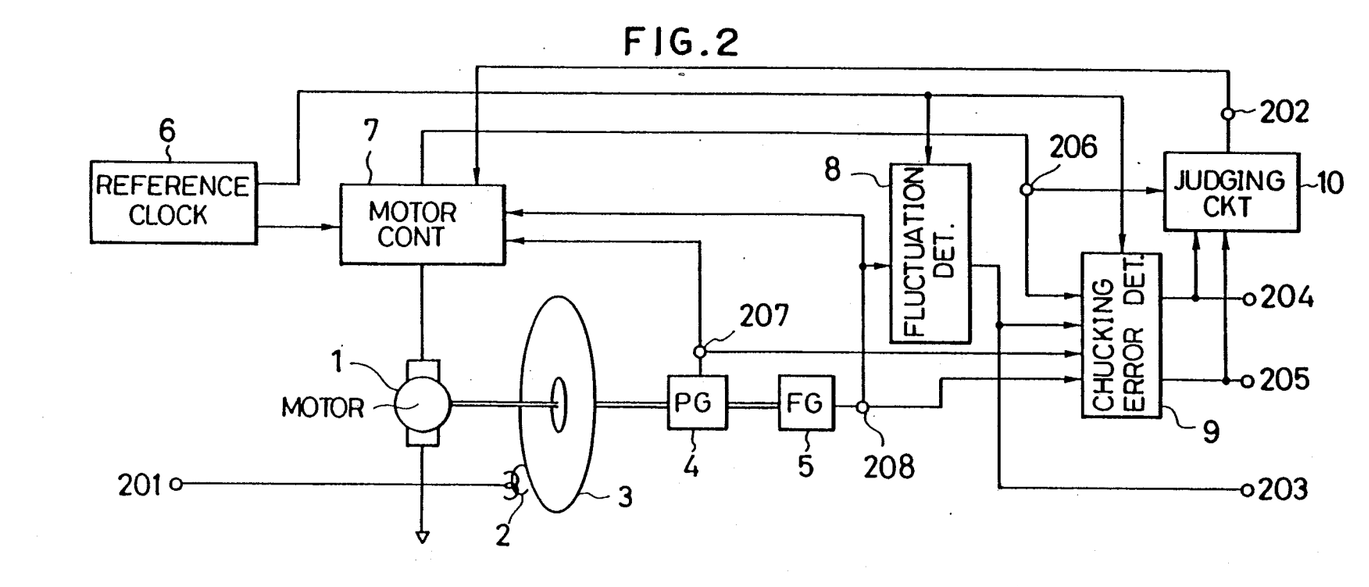
FIG. 2 is a block diagram of an apparatus embodying the present invention.

FIG. 2 is a block diagram showing an example of the apparatus of the present invention, wherein a spindle motor 1 rotates a video floppy disk 3 mounted on a loader L (now shown in FIG. 2) as shown in FIG. 1. A record/reproducing magnetic head 2 is connected to an input/output terminal 201 to which the image signal to be recorded or the reproduced image signal is supplied. A rotational phase signal generator (PG) 4 generates a pulse in every turn of the video floppy disk. A frequency generator (FG) 5 generates several pulses in every turn of the video floppy disk. A reference numeral 6 indicates a reference clock signal generator. A motor rotation control device 7, the motor 1, phase signal generator (PG) 4 and frequency generator (FG) 5 together constitute a servo mechanism for; stably controlling the rotation of the motor 1 by the phase control and speed control methods. A rotational fluctuation detecting device 8, for detecting fluctuation in rotation by inspecting the interval of the phase signals, sends a signal of L-level to a terminal 203 during the fluctuation in rotation. A chucking error detecting device 9, for detecting a defective hub or chucking error of the video floppy disk, is connected to an input terminal 206 receiving a locked-in signal from the motor rotation control device 7, a terminal 203 receiving the rotational fluctuation signal from the rotational fluctuation detecting device 8, a terminal 207 for receiving the phase signal (hereinafter, the PG signal) from the phase signal generator, and a terminal 208 receiving an inverted frequency signal (hereafter the FG signal) from the frequency generator. The chucking error detecting device 9 sends a chucking error signal and a detection period end signal respectively to terminals 204, 205, which are connected to a judging circuit 10 and an external sequence circuit (now shown). Said judging circuit 10 sends a motor stop signal to a terminal 202 if the chucking error signal assumes the L-level before the detection period end signal assumes the H-level. Said terminal 202 is connected also to the motor rotation control device, which immediately terminates the rotation of the motor when said motor stop signal assumes the active (H) level.

Figure 3:
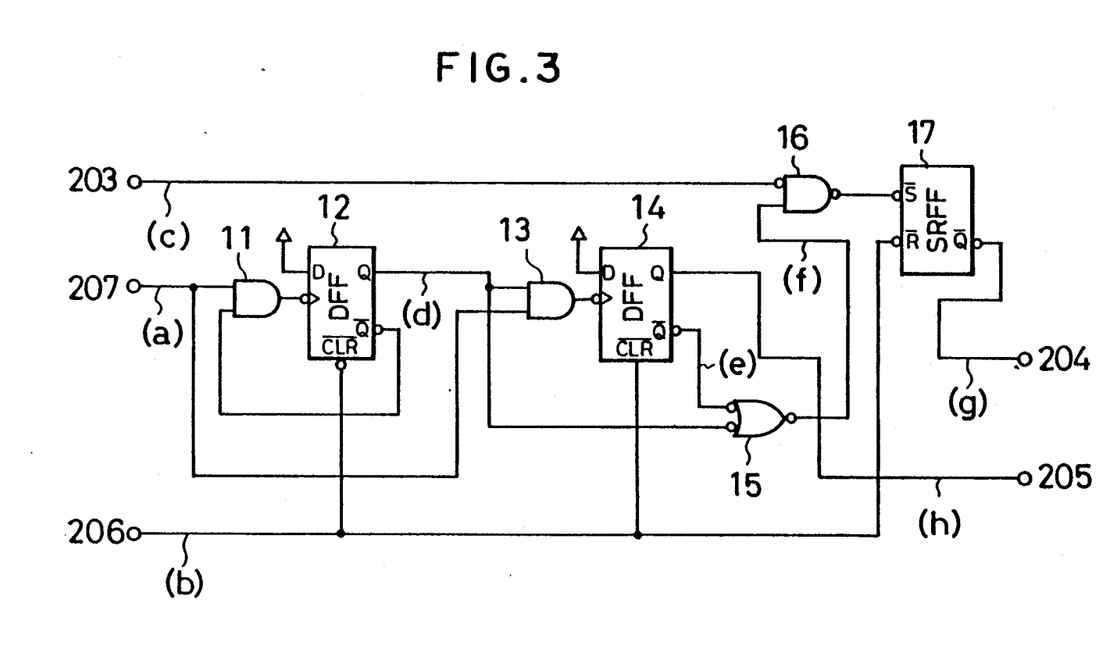
FIG. 3 is a circuit diagram showing an example of the circuit constituting a chucking error detecting device for use in the first disk driver.

FIG. 3 is a circuit diagram of the chucking error detecting device 9 employed in the abovementioned first disk driver. Said device is composed of AND gates 11, 13, 16; an OR gate 15; D-flip-flops (DFF) 12, 14; and an SR-flip-flop (SRFF) 17. Terminals 203-207 are same as those shown in FIG. 2. The function of said circuit will be explained in the following, with reference to a timing chart shown in FIG. 4. At the first downshift of the PG signal (a) during the H-level state of the locked-in signal (b), the output signal (d) of the terminal Q of the D-flip-flop 12 is shifted from the L-level to the H-level. Then at the second downshift of the PG signal (a), the output signal (h) of the terminal Q of the D-flip-flop 14 is shifted from the L-level to the H-level, and the output signal (e) of the terminal $\overline{Q}$ thereof is shifted from the H-level to the L-level.

Figure 4:
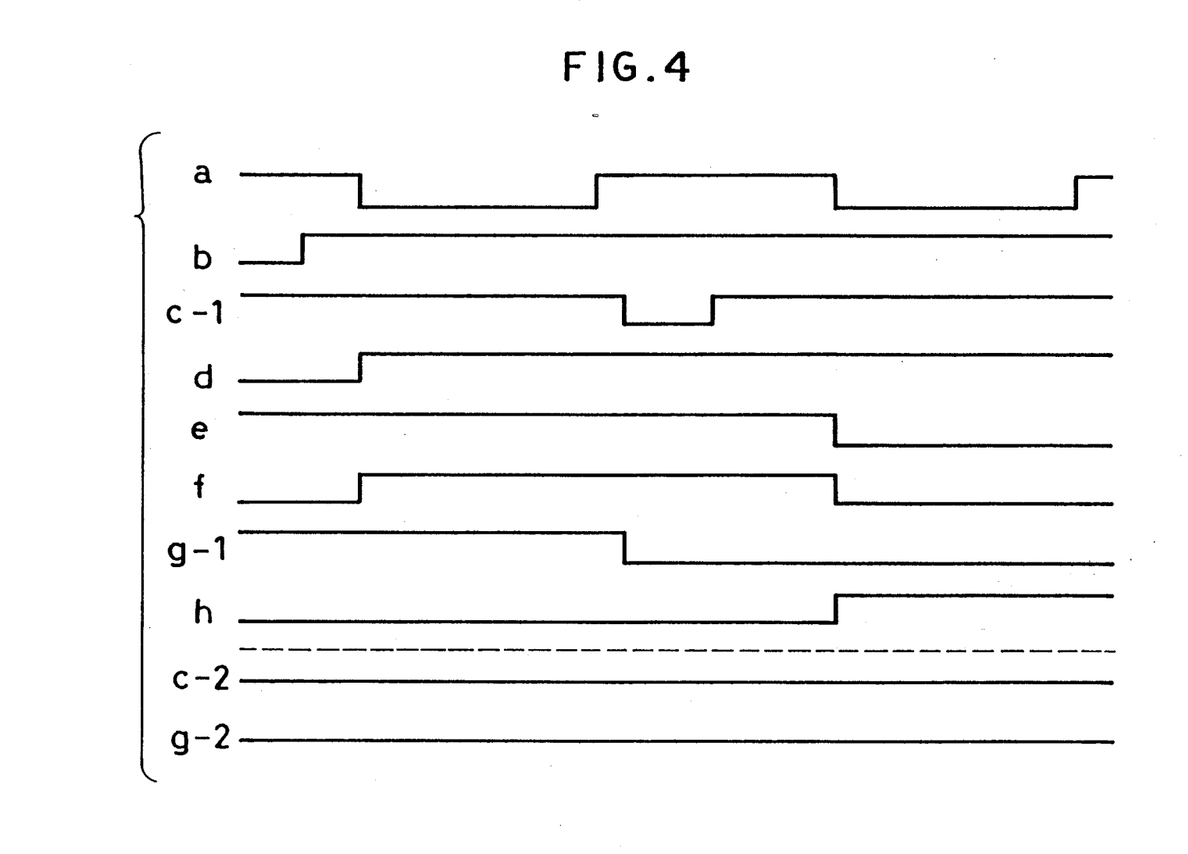
FIG. 4 is a timing chart of the circuit shown in FIG. 3 at the start thereof.

The output signal (f) of the OR gate 15 is shifted to the H-level for a PG cycle (from downshift of the PG signal to the next downshift) from the first downshift of the PG signal after the lock-in, thereby transmitting the rotational fluctuation signal (c) to the SR-flip-flop. If said signal (c) assumes the L-level during this period, the output signal (g) of said SR-flip-flop is shifted to the L-level and sent to the terminal 204 as the chucking error signal. The output signal of the terminal Q of the D-flip-flop 14 constitutes the detection period end signal (h) which is supplied to the terminal 205.

A signal (c-1) in FIG. 4 indicates the case of a rotational fluctuation within a PG cycle from the first downshift of the PG signal after the lock-in, and the chucking error signal in this state is shown by (g-1). On the other hand, a signal (c-2) indicates the case of absence of rotational fluctuation within said PG cycle, and the corresponding chucking error signal is shown by (g-2).

Figure 5:
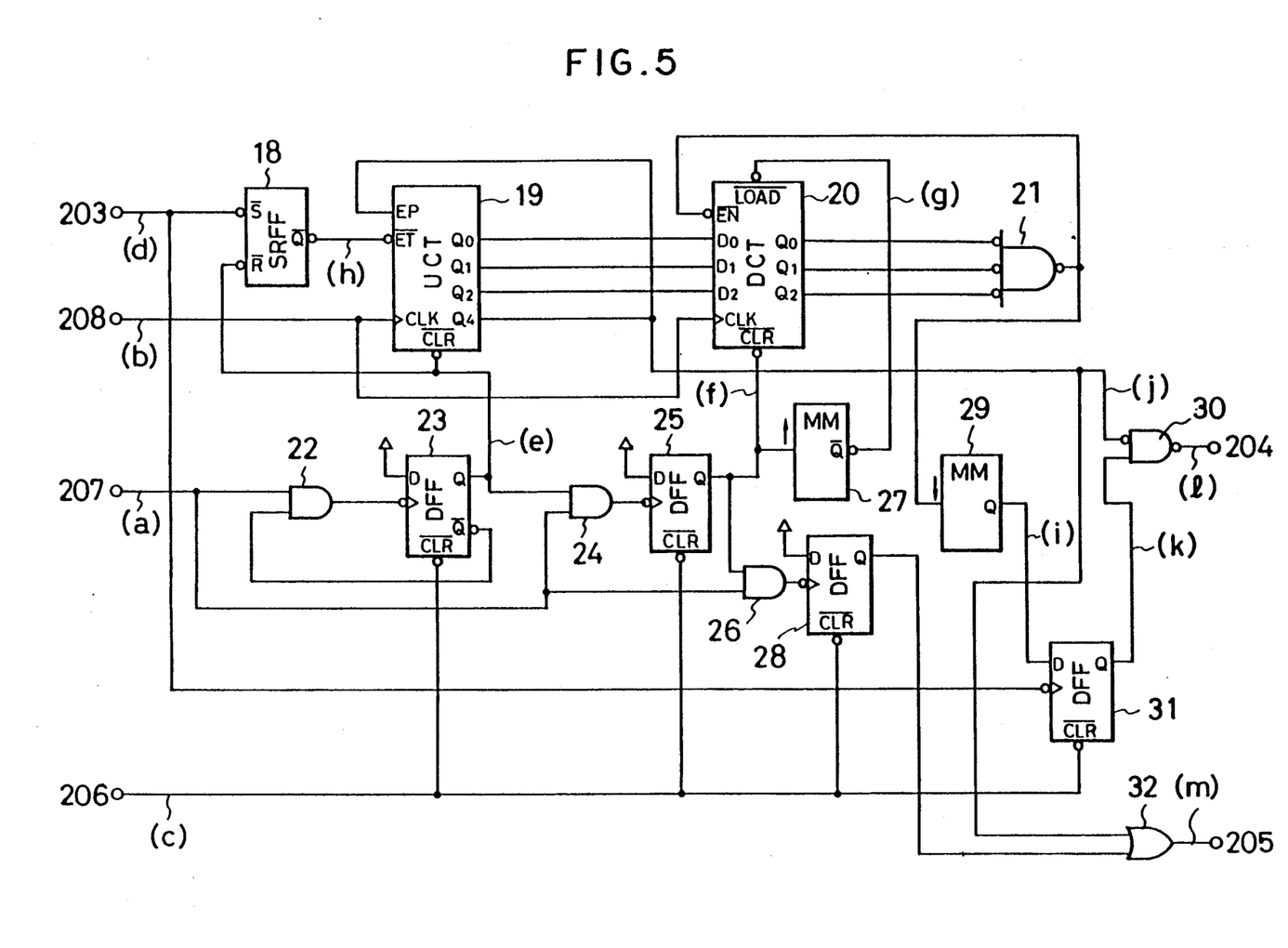
FIG. 5 is a circuit diagram showing an example of the circuit constituting a chucking error detecting device for use in the second disk driver.

FIG. 5 is a circuit diagram showing an example of the chucking error detecting device 9 for use in the second disk driver of the present invention, wherein the detection is conducted for two consecutive PG cycles from the first cycle after the lock-in. Said circuit is composed of a SR-flip-flop 18; a 4-bit up-counter (UCT) 19 with count stop terminals $\overline{ET}$, EP; a 3-bit down-counter (DCT) 20 with a count stop terminal $\overline{EN}$ and loadable with 3-bit initial data ($D_{0-D2}$); AND gates 21, 22, 24, 26, 30; D-flip-flop 23, 25, 28, 31; monostable multivibrators (MM) 27, 29; and an OR gate 32. Terminals 203-208 are same as those shown in FIG. 2. The frequency generator (FG) employed in the motor of the present circuit generates 8 pulses in a PG cycle.

Figure 6:
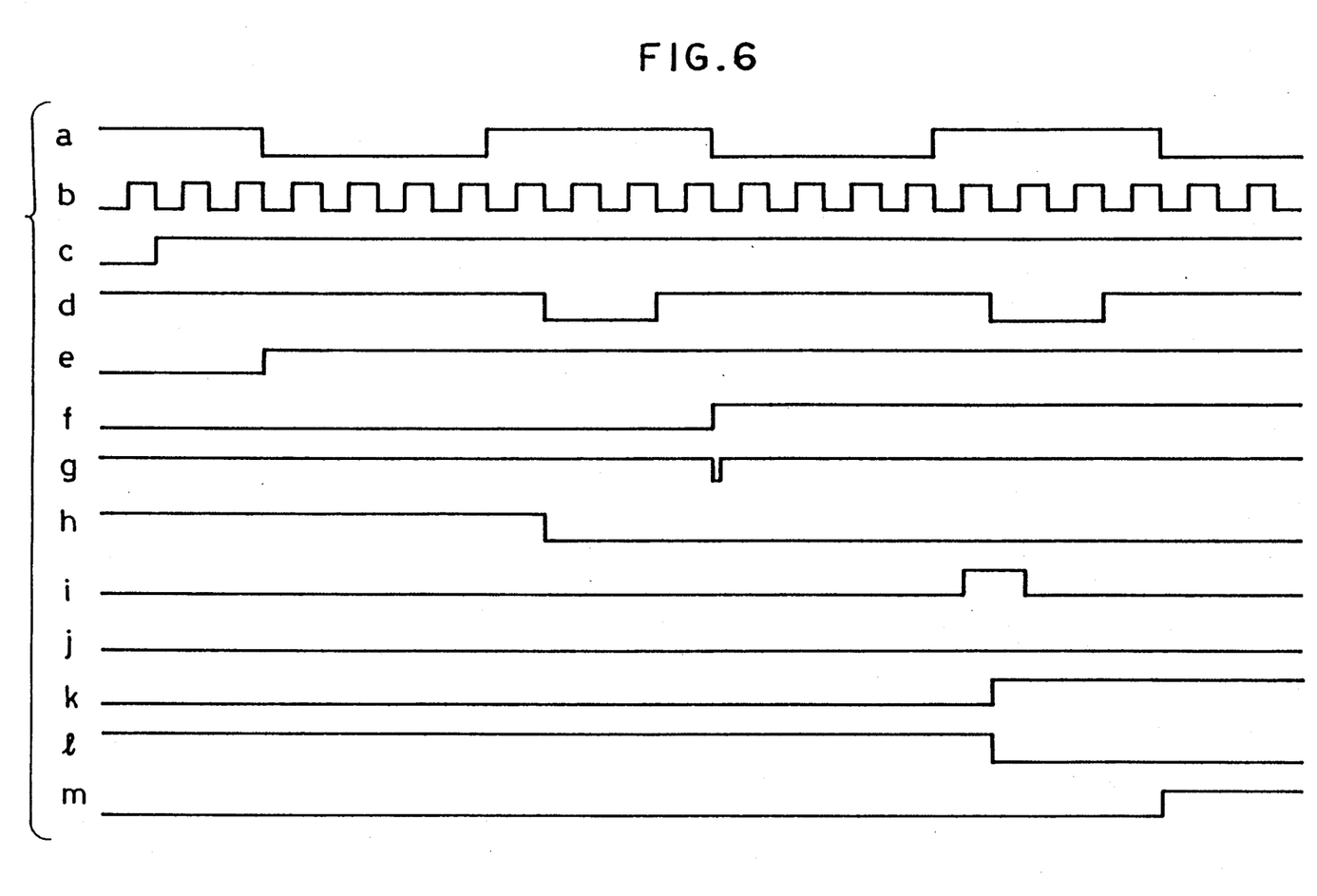
FIGS. 6 and 7 are timing charts of the circuit shown in FIG. 5 at the start thereof.

In the following the function of this circuit is explained, with reference to the timing charts shown in FIGS. 6 and 7. FIG. 6 shows a first pattern in which a chucking error is present. In this case the rotation fluctuation signal (d) appears at a substantially same position in each PG cycle. At the first downshift of the PG signal (a) after the lock-in, the output signal (e) of the terminal Q of the D-flip-flop 23 is shifted from the L-level to the H-level, whereby the up-counter 19 starts to count the upshifts of the frequency generator signal (b). Then the L-level of the rotational fluctuation signal (d) is latched by the SR-flip-flop, whereby the output terminal $\overline{Q}$ thereof releases a rotational fluctuation latch signal (h). Thus the counting operation of the up-counter is terminated, and the position of the rotational fluctuation signal is memorized. Then at the second downshift of the PG signal (a) after the lock-in, the output signal (f) of the terminal Q of the D-flip-flop 25 is shifted from the L-level to the H-level. Said upshift of the output signal (f) triggers the monostable multivibrator 27 to generate a shift pulse (g) from the terminal $\overline{Q}$ thereof. In response the outputs of the terminals $Q_0-Q_2$ of the up-counter 19, indicating the position of rotational fluctuation, are loaded in the downcounter 20, which starts to count downwards the upshifts of the frequency generator signals (b). Said counting operation is terminated when the count of said down-counter 20 reaches zero, namely when all the outputs of the terminals $Q_0-Q_2$ of said downcounter 20 assume the L-level. Simultaneously the monostable multivibrator 29 is triggered to send a pulse (i), of a duration of about one pulse interval of the frequency generator, from the terminal Q thereof to the terminal D of the D-flip-flop 31. If the rotational fluctuation signal (d) again shows another downshift during said pulse interval, the output signal (k) of the terminal Q of the D-flip-flop 31 is shifted from the L-level to the H-level. In this case, since the counting operation of the upcounter 19 is already stopped before, the output signal ($j_A$) of the terminal $Q_4$ of the up-counter 19 remains at the L-level. Consequently said output signal (k) of the terminal Q of the D-flip-flop 31 is supplied, as the chucking error detection signal ($\lambda$), to the terminal 204. Then, at the third downshift of the PG signal (a) after the lock-in, the output signal of the terminal Q of the D-flip-flop 28 is shifted from the L-level, and is supplied, as the detection period end signal (m), to the terminal 205 by OR gate 32, as the terminal $Q_4$ of the up-counter 19 is at the L-level as explained before.

Figure 7:
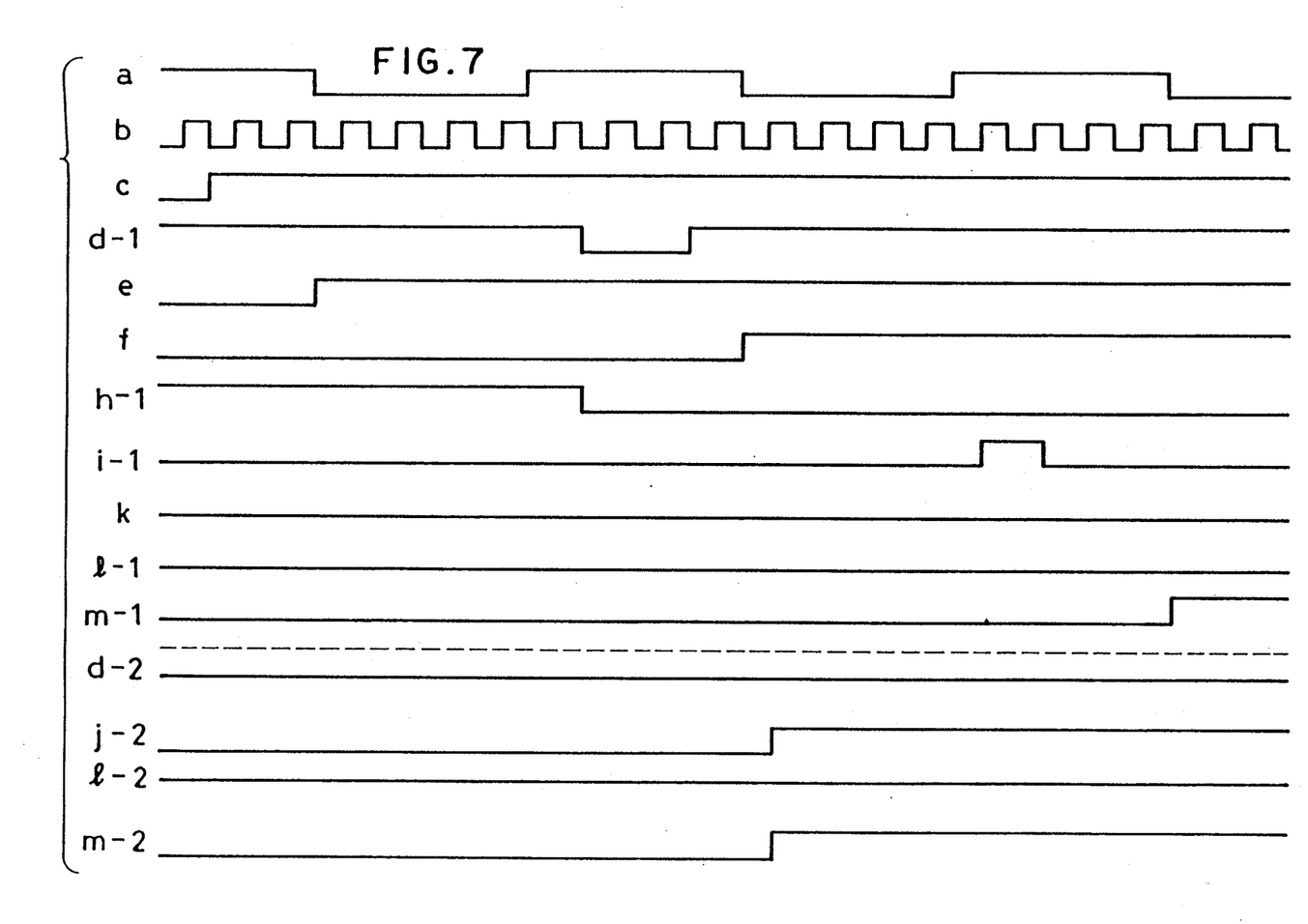

FIG. 7 is a timing chart of the signals in case a proper video floppy disk is chucked in a normal manner. Signals with a suffix 1 indicate a second pattern in which a rotational abnormality occurs in the first PG cycle after the lock-in for example by an external perturbation but the rotation becomes normal in the second PG cycle and thereafter, while signals with a suffix 2 indicate a third pattern without any abnormality in rotation. Signals with no suffix are common to both cases. Signals in the second pattern are same as those in the first pattern until the down counting is terminated at count zero. When the count of the down-counter 20 reaches zero, the monostable multivibrator 29 generates a pulse (i), but the terminal Q of the D-flip-flop 31 remains at the L-level, as the rotational abnormality signal (d-1) does not assume the L-level due to the absence of rotational abnormality during the period of said pulse (i). Thus the chucking error signal (λ-1) remains in the H-level, so that chucking error is not detected before the detection end signal (m-1) assumes the H-level. In the third pattern, after the start of counting operation of the up-counter 19, the output signal (j-2) of the terminal $Q_4$ of said up-counter assumes the H-level at the 8th count, whereby the counting operation is terminated. Prior to this, at the second down-shift of the PG signal (a) from the lock-in, signals "0" are loaded in the terminals $D_0$–$D_2$ of the down-counter 20, and the counting operation thereof remains stopped. When the output signal (j-2) of the terminal $Q_4$ of the up-counter 19 assumes the H-level, the detection period end signal (m-2) assumes the H-level. Thus the detecting operation is terminated while the chucking error signal (λ-2) remains in the H-level.

Figure 8:
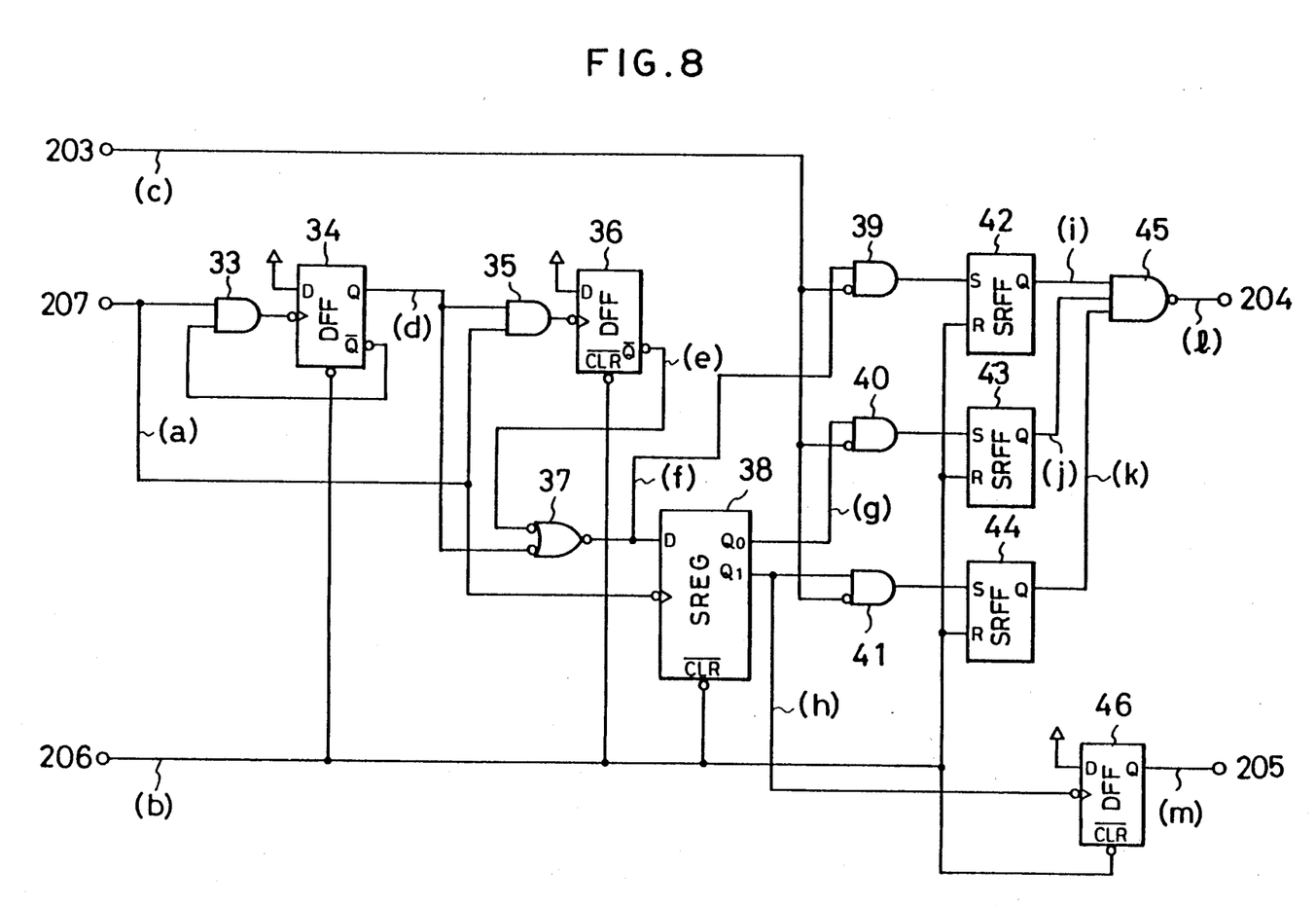
FIG. 8 is a circuit diagram showing an example of the circuit constituting a chucking error detecting device for use in the third disk driver.

FIG. 8 shows an example of the chucking error detecting device 9 for use in the third disk driver of the present invention, wherein the detection is conducted for 3 PG cycles after the lock-in. The circuit is composed of AND gates 33, 35, 39–41, 45; D-flip-flops 34, 36, 46; an OR gate 37; a 2-bit shift register (SREG)38; and SR-flip-flops 42–44. Terminals 203–207 are same as those shown in FIG. 2.

Figure 9:
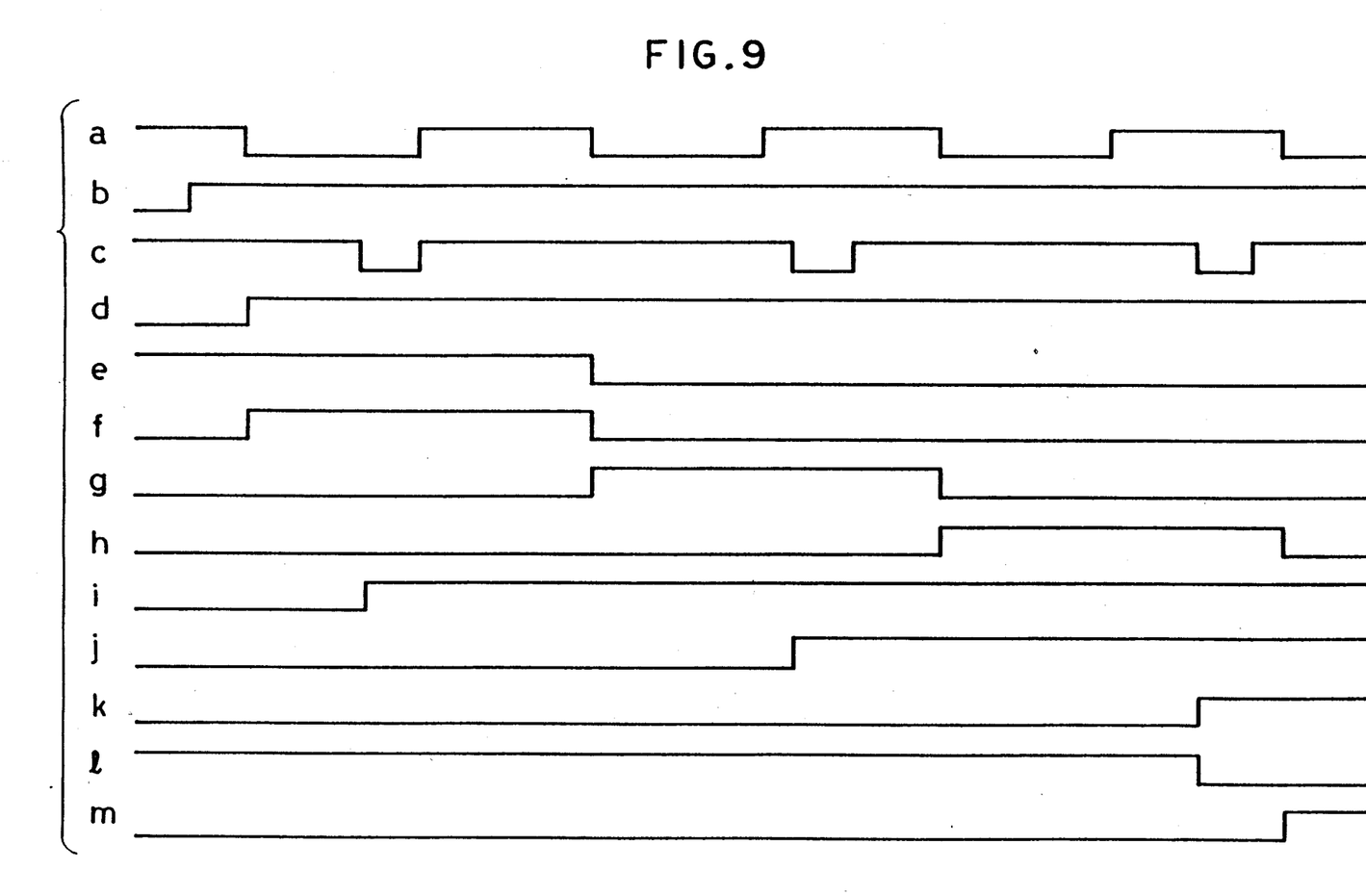
FIG. 9 is a timing chart of the circuit shown in FIG. 8 at the start thereof.

In the following the function of said circuit in the presence of a chucking error is explained, with reference to a timing chart shown in FIG. 9. At the first downshift of the PG signal (a) after the lock-in, the output signal (d) of the terminal Q of the D-flip-flop 34 is shifted from the L-level to the H-level, and, at the second downshift, the output signal (e) of the terminal $\overline{Q}$ of the D-flip-flop 36 is shifted from the H-level to the L-level. The OR gate 37 generates a first PG cycle signal (f), and the shift register 38 generates a second PG cycle signal (g) and a third PG cycle signal (h). A rotational abnormality signal during the first PG cycle is latched by the SR-flip-flop 42. Similarly the rotational abnormality signal in the second or third PG cycle is respectively latched by the SR-flip-flop 43 or 44. Then the output of the AND gate 45 is shifted to the L-level and is supplied, as the chucking error signal (λ) to the terminal 204. Also at the downshift of the third PG cycle signal (h), the output signal of the D-flip-flop 46 is shifted from the L-level to the H-level, and is supplied, as the detection period end signal (m), to the terminal 205.

In the absence of chucking error, at least one of the output signals of the SR-flip-flops 42–44 assumes the L-level, whereby the chucking error signal (λ) remains at the H-level.

Figure 10:
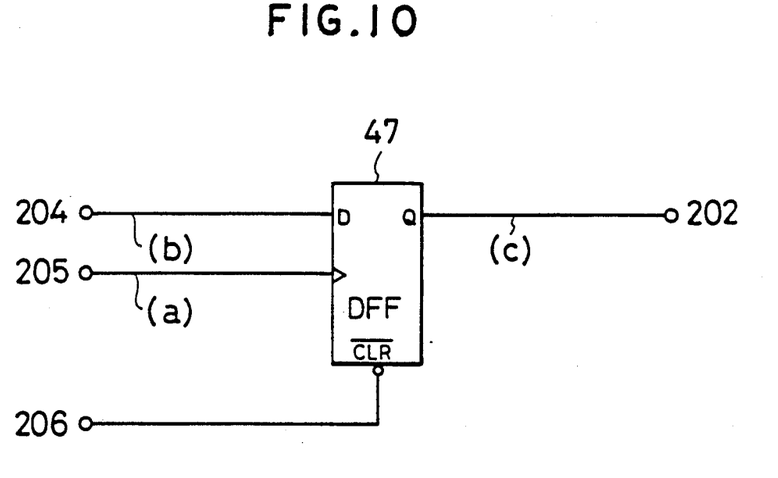
FIG. 10 is a circuit diagram showing an example of a judging circuit 10 shown in FIG. 2.

FIG. 10 shows an example of the judging circuit 10 of the present invention, composed of a D-flip-flop 47. Terminals 202, 204–206 are same as those shown in FIG. 2. At the upshift of the detection period end signal (a), the chucking error signal (b) is latched, whereby the terminal Q sends a motor stop signal (c) to the terminal 202. Said terminal 202 is connected to the motor rotation control device 7, so that the motor stop signal (c) of the H-level brakes the motor, thus terminating the rotation thereof.

As explained in the foregoing, the disk drivers of the foregoing embodiments are capable of detecting the defective hub or the chucking error in the video floppy disk, thus preventing periodical fluctuations in rotation resulting from such troubles and ensuring satisfactory recording or reproducing operation. Also said disk drivers immediately terminate the rotation of the motor, in response to the detection of defective hub or chucking error, thereby minimizing the contact between the floppy disk and the disk driver resulting in such troubles, and thus protecting the mechanical part of the disk driver. Particularly in an electronic still camera, a valuable opportunity of photographing will be lost if the periodical fluctuation in rotation is found after the shutter is released. However, according to the present invention, the defective hub or chucking error of the video floppy disk can be detected prior to the shutter releasing, in fact prior to the pre-scanning of the video floppy disk on the camera. Consequently chance of photographing is not lost. Also the chucking error detecting device of the present invention can be easily made compact, since it can be all composed of digital circuits and can be realized with a gate array or a CPU.

What is claimed is:

1. A floppy disk driver comprising:
   loading means for loading a floppy disk capable of recording an analog signal,
   rotation means for rotating said floppy disk at a constant predetermined rotational speed,
   speed detecting means for detecting that said floppy disk reaches said predetermined rotational speed and for producing a speed detection signal,
   fluctuation detecting means for detecting fluctuation in the rotational speed of said floppy disk and for producing a fluctuation detection signal, and
   defect determining means responsive to said speed detection signal and to said fluctuation detection signal for determining the presence of a defect condition which causes fluctuation in the rotational speed of said floppy disk, based on production of said fluctuation detection signal during a predetermined period after production of said speed detection signal, and for causing said rotation means to stop rotating said floppy disk when said defect condition is determined to be present.

2. A floppy disk driver according to claim 1, further comprising rotation detecting means for detecting rotations of said floppy disk and for producing a rotation indicating signal, and wherein said defect determining means is responsive to said rotation indicating signal.

3. A floppy disk driver according to claim 2, wherein said predetermined period corresponds to a first rotation of said floppy disk indicated by said rotation indicating signal after production of said speed detection signal.

4. A floppy disk driver according to claim 3, wherein said defect determining means includes error detection circuit means for producing an error signal when said fluctuation detection signal is produced during said first rotation of said floppy disk.

5. A floppy disk driver according to claim 4, wherein said error detection circuit means produces a detection period end signal upon completion of said first rotation of said floppy disk.

6. A floppy disk driver according to claim 5, wherein said defect determining means includes judging circuit means responsive to said error signal and said detection period end signal for producing a control signal to cause said rotation means to stop rotating said floppy disk when said error signal is produced before said detection period end signal.

7. A floppy disk driver according to claim 2, wherein said predetermined period corresponds to a first rotation and a second rotation of said floppy disk indicated by said rotation indicating signal after production of said speed detection signal, and said defect determining means determines the presence of said defect condition when said fluctuation detection signal is produced at substantially the same time during said first and second rotations of said floppy disk.

8. A floppy disk driver according to claim 7, wherein said defect determining means includes error detection circuit means for producing an error signal when said fluctuation detection signal is produced at substantially the same time during said first and second rotations of said floppy disk.

9. A floppy disk driver according to claim 8, further comprising frequency signal generating means for producing a frequency signal at intervals during individual rotations of said floppy disk, and wherein said error detection circuit means includes first counter means for counting occurrences of said frequency signal during said first rotation of said floppy disk until said fluctuation detection signal is produced, second counter means for counting a substantially equal number of occurrences of said frequency signal during said second rotation of said floppy disk, and means for producing said error signal if said fluctuation detection signal is produced substantially upon completion of counting by said second counter means.

10. A floppy disk driver according to claim 8, wherein said error detection circuit means produces a detection period end signal upon completion of said second rotation of said floppy disk.

11. A floppy disk driver according to claim 10, wherein said defect determining means includes judging circuit means responsive to said error signal and to said detection period end signal for producing a control signal to cause said rotation means to stop rotating said floppy disk when said error signal is produced before said detection period end signal.

12. A floppy disk driver according to claim 2, wherein said predetermined period corresponds to an initial plurality of rotations of said floppy disk indicated by said rotation indicating signal after said speed detection signal is produced, and said defect determining means determines the presence of said defect condition when said fluctuation detection signal is produced during each of said plurality of rotations of said floppy disk.

13. A floppy disk drier according to claim 12, wherein said defect determining means includes error detection circuit means for producing an error signal when said fluctuation detection signal is produced during each of said plurality of rotations of said floppy disk.

14. A floppy disk driver according to claim 13, wherein said error detection circuit means produces a detection period end signal upon completion of said plurality of rotations of said floppy disk.

15. A floppy disk driver according to claim 14, wherein said defect determining means includes judging circuit means responsive to said error signal and to said detection period end signal for producing a control signal to cause said rotation means to stop rotating said floppy disk when said error signal is produced before said detection period end signal.

* * * * *